(12) United States Patent
Graf

(10) Patent No.: US 6,572,128 B2
(45) Date of Patent: Jun. 3, 2003

(54) RATCHET PROPULSION SYSTEM FOR SCOOTERS

(76) Inventor: Horst Graf, 425 Ena Rd. PH5B, Honolulu, HI (US) 96815

( * ) Notice: Subject to any disclaimer, the term of this patent is extended or adjusted under 35 U.S.C. 154(b) by 11 days.

(21) Appl. No.: 09/845,871

(22) Filed: Apr. 29, 2001

(65) Prior Publication Data

US 2002/0158440 A1 Oct. 31, 2002

(51) Int. Cl.⁷ .................................................. B62M 1/04
(52) U.S. Cl. ...................................... 280/221; 280/258
(58) Field of Search ................................ 280/220, 221, 280/252, 253, 254, 255, 258

(56) References Cited

U.S. PATENT DOCUMENTS

| | | | | |
|---|---|---|---|---|
| 1,750,187 A | * | 3/1930 | Miller et al. |
| 2,076,804 A | * | 4/1937 | Winding |
| 2,148,919 A | * | 2/1939 | Winding |
| 2,723,131 A | * | 11/1955 | McChesney, Jr. |
| 3,006,659 A | * | 10/1961 | Krasnoff et al. |
| 3,362,723 A | * | 1/1968 | Bretholz |
| 3,415,540 A | * | 12/1968 | Portnoff |

* cited by examiner

Primary Examiner—Kevin Hurley
(74) Attorney, Agent, or Firm—Michael I. Kroll (57) ABSTRACT

A scooter propulsion system is provided both as a kit for retrofitting and as an improved original manufacture. A foot pedal pivots forwardly and rearwardly as the user presses on a front foot pedal portion and rear foot pedal portion, respectively. A ratchet bar is pulled forward when the front pedal portion is pressed and rearward when the rear pedal portion is pressed. A free-wheeling sprocket-like gear on the rear wheel axle is rotated forward by rack-like ratchet bar teeth when the ratchet bar is pulled forward thus engaging spring pawls of the rear wheel axle gear with a rear wheel hub. A ratchet bar guard biases the ratchet bar against the rear wheel axle gear. When the rear pedal portion is pushed the rear wheel axle gear freewheels backwards as the ratchet bar moves rearwardly. A smooth portion of the ratchet bar rests against the rear wheel axle gear when the rear pedal portion is pressed to its down position.

18 Claims, 12 Drawing Sheets

RATCHET PROPULSION SYSTEM FOR SCOOTERS

BACKGROUND OF THE INVENTION

1. Field of the Invention

The present invention relates generally to scooter propulsion devices and more specifically to a retrofit ratchet propulsion system for scooters.

2. Description of the Prior Art

There are other scooter propulsion devices designed for scooter propulsion. Typical of these is U.S. Pat. No. 125,451 issued to Gregg on Apr. 9, 1872.

Another patent was issued to Bollinger on Feb. 19, 1907 as U.S. Pat. No. 844,319. Yet another U.S. Pat. No. 1,190,089 was issued to Bellairs on Jul. 4, 1916 and still yet another was issued on Oct. 2, 1928 to Martin as U.S. Pat. No. 1,686,389.

Another patent was issued to Matushak et al on Jan. 13, 1931 as U.S. Pat. No. 1,788,774. Another patent was issued to Clarke on Jul. 19, 1932 as U.S. Pat. No. 1,867,731. Another patent was issued to Welch on Jul. 12, 1938 as U.S. Pat. No. 2,123,390. Another patent was issued to Kander on Mar. 13, 1951 as U.S. Pat. No. 2,544,996. Another patent was issued to May on Sep. 22, 1964 as U.S. Pat. No. 3,149,857.

Another patent was issued to Whitehouse on Mar. 30, 1965 as U.S. Pat. No. 3,175,844. Another patent was issued to Lew et al on Apr. 15, 1986 as U.S. Pat. No. 4,582,342. Another patent was issued to Huang on Aug. 2, 1988 as U.S. Pat. No. 4,761,014. Another patent was issued to Szadkowski on Jul. 11, 1989 as U.S. Pat. No. 4,846,488. Another patent was issued to Kruczek on Feb. 20, 1996 as U.S. Pat. No. 5,492,345. Another patent was issued to Dickson et al on Nov. 30, 1999 as U.S. Pat. No. 5,992,864.

U.S. Pat. No. 125,451

Inventor: Solon A. Gregg

Issued: Apr. 9, 1872

The invention for its object to furnish an improved velocipede-wagon simple in construction and convenient in use, being so constructed as to adapt it for use upon common roads.

U.S. Pat. No. 844,319

Inventor: Alexander M. Bollinger

Issued: Feb. 19, 1907

The object of the invention is to provide a comparatively simple and inexpensive vehicle having a hand lever pivotally mounted for lateral movement on the supporting frame and operatively connected with the drive mechanism whereby motion may be transmitted to the rear axle of the vehicle when the hand lever is operated.

U.S. Pat. No. 1,190,089

Inventor: John W. Bellairs

Issued: Jul. 4, 1916

The invention aims primarily to provide a velocipede so constructed that the operator may stand upon operating levers while steering, to the end that the entire weight of the operator may be made effective to actuate the levers.

U.S. Pat. No. 1,686,389

Inventor: Bert B. Martin

Issued: Oct. 2, 1928

The invention relates to an improved toy vehicle of the type including a platform on which the occupant rides while in standing position, the platform being suspended close to the surface, in order that it may be readily mounted or dismounted while moving.

U.S. Pat. No. 1,788,774

Inventor: Joseph Matushak

Issued: Jan. 13, 1932

This invention relates to vehicles and more particularly to a child's vehicle of the type known as a scooter and may be propelled forwardly by means of a mechanism including a pedal.

U.S. Pat. No. 1,867,731

Inventor: Herman E. Clarke

Issued: Jul. 19, 1932

The present invention relates to improvements to wheeled toys which are particularly adapted for use by small children. The object of the invention is to provide a toy which will give healthy exercise to a child and enable him to simulate a movement such as that of riding a horse and to utilize the movement and effort to propel the toy.

U.S. Pat. No. 2,123,390

Inventor: John M. Welch

Issued: Jul. 12, 1938

A device is provided that relates to scooters and a propelling or drive means therefor, which is simple and easy for a child to actuate for permitting the child to ride the device entirely free of the ground and to utilize the steering handle bar for driving the front wheel of the device.

U.S. Pat. No. 2,544,996

Inventor: Rudolf Kander

Issued: Mar. 15, 1951

This invention relates to improvements in scooters, the type of wheeled vehicle which children propel through force applied with one foot on the surface on which the scooter travels and with the other foot and body weight normally supported on the low platform of the vehicle and provides for foot-power propulsion applied through a treadle to forcibly drive the rear wheel of the vehicle. The object of the invention is to provide a scooter with treadle-operable drive, and an over-running or free-wheeling clutch.

U.S. Pat. No. 3,149,857

Inventor: George May

Issued: Sep. 22, 1964

This invention relates to a novel and useful amusement vehicle which is adapted to be propelled by a child by means of a driving connection with a drive wheel of the vehicle which is perhaps most commonly known for its use in the construction of an Irish Mail type of vehicle.

U.S. Pat. No. 3,175,844

Inventor: George Whitehouse

Issued: Mar. 10, 1965

The invention relates to scooters with an improved driving mechanism for treadle type scooters. The child standing with one foot upon the platform engages the treadle with the opposite foot for propelling the scooter forwardly, without necessarily pressing the foot upon the surface over which the scooter is moving.

U.S. Pat. No. 4,582,342

Inventors: Hyon Lew and Yon K. Lew

Issued: Apr. 15, 1986

This invention relates to a self-propelled roller board that provides mobility for people in downtown areas, campuses and neighborhood localities. The pediroller board comprises one or two free-wheeling front wheels steerably affixed to an oblong board near one extremity thereof and a pair of rear wheels affixed to the oblong board near the other extremity wherein the rear wheels are driven by a pedal-powered gear driving a pinion gear including a ratchet drive driving the axle of the rear wheels. A person riding the pediroller board balances oneself by standing with one foot placed on the front portion of the oblong board and by holding a joystick type steering lever and propels the pediroller board by pedaling a pedal disposed near the rear extremity of the oblong board wherein the up-and-down motion of the pedal is converted to the rotating motion of the drive gear by a crank mechanism.

U.S. Pat. No. 4,761,014

Inventor: Kung Huang

Issued: Aug. 2, 1988

A scooter of an ordinary general shape but equipped with an improved mechanical drive for the rear wheel or wheels, which drive is comprised of a ratchet mechanism for driving the rear wheel, a stepping lever for transferring the stepping force of the rider to the ratchet mechanism and a retrieving means for raising the stepping lever to the original position as the stepping force is released therefrom; whereby, the scooter can be propelled by the intermittent force of the rider to advance forwardly.

U.S. Pat. No. 4,846,488

Inventor: Andrzej Szadkowski

Issued: Jul. 11, 1989

A spring drive and a spring drive scooter for use by an operator. The spring drive and spring drive scooter have a frame, a resilient member connected to the frame, a pedal, and a movement. The pedal is supported by the resilient member. The pedal is disposed to bear the operator. The pedal is capable, together with the operator, of oscillatory motion relative to the frame in response to at least roughly periodic impulses supplied to the pedal by the operator at a range of frequencies including a resonant frequency. The movement is connected to the frame and includes a final driven member. The movement is actuated by reciprocation of the pedal, and the movement is capable of converting oscillatory motion of the pedal into circular motion of the final driven member.

U.S. Pat. No. 5,492,345

Inventor: Leszek Kruczek

Issued: Feb. 20, 1996

Spaced frame rails mount a U-shaped frame therebetween, wherein the U-shaped frame is pivotally mounted relative to a first axle mounting a first wheel at a first end of the side rails, with a second axle mounted at the second end of the side rails supporting a second wheel. The side rails include extension legs extending from the side rails mounting a spool axle, with the spool axle mounting a first spool wheel that is mechanically coupled to the U-shaped support frame by means of a first string, with a second string directed from a second spool wheel on the spool axle to a third spool wheel mounted to the second axle, that in turn includes a ratchet and pawl structure, whereupon pivoting of the U-shaped frame rotates the first and second spool wheels as well as the third spool wheel to effect rotation of the ratchet and second axle effecting propulsion of the roller skate structure.

U.S. Pat. No. 5,992,864

Inventor: Brett Dickson

Issued: Nov. 30, 1999

A motorless human-powered scooter is disclosed having a sturdy frame with a fixed position rear wheel and a steerable fork which carries a steerable front wheel. The front and rear wheels are substantially equal in diameter and each has a diameter of about one-third the total length of the scooter. A preferred manner for attaching the scooter's main tube to its bottom tube and deck is disclosed.

While these devices may be suitable for the purposes for which they were designed, they would not be as suitable for the purposes of the present invention, as hereinafter described.

SUMMARY OF THE PRESENT INVENTION

A primary object of the present invention is to provide a scooter that is ratchet propelled by a foot-powered ratchet mechanism.

Another object of the present invention is to provide a ratchet propulsion system on a scooter that operates by the user shifting their body weight.

Yet another object of the present invention is to provide a ratchet propulsion system that achieves forward motion by placing both feet on a pedal, one behind the other.

Still yet another object of the present invention is to provide a scooter having a freewheeling sprocket-like rear wheel axle gear having spring pawls that engage the rear wheel hub when driven forward by a ratchet bar and disengage from the rear wheel hub when the ratchet bar is stationary or traveling rearward.

Additional objects of the present invention will appear as the description proceeds.

The present invention overcomes the shortcomings of the prior art by providing a ratchet propulsion system for retrofit to a typical scooter, or as part of the original manufacture. A foot pedal has a forward position and a rearward position. The rider moves the pedal to the forward position by shifting his or her weight to the front section of the pedal, pushing the front portion of the pedal downward. This motion pulls a ratchet bar having a rack-like row of teeth. The teeth are pulled across a sprocket-like gear on the rear wheel axle, thus engaging the rear wheel axle gear and spring pawls engaging the rear wheel hub and propelling the scooter forward by rotating the rear wheel hub. By stepping on the rear portion of the pedal the ratchet bar is pushed rearward and the rear wheel hub becomes out of engagement with the spring pawls of the rear wheel axle gear. When the rear pedal portion is down, the foot pedal is in its rear position and the smooth portion of the ratchet bar is against the rear wheel axle gear.

The rider gains more speed each time the front pedal portion is so raised and again pressed down by the rider's foot.

At all times the ratchet bar is held proximate the rear wheel axle gear by a ratchet guard through which the ratchet bar is inserted.

The pedal bracket, attaching the frame to the pedal is constructed from strong, durable material as the weight of the rider rests on those parts.

A scooter propulsion system is provided for a scooter of the type having a frame upon which the rider places at least one foot, a steering assembly having a front wheel, and a rear wheel having an axle attached to the frame, the system comprising: a free wheeling rear wheel axle gear attached for rotation with the rear wheel hub, the rear wheel axle gear having teeth; a foot pedal having a front pedal portion and a rear pedal portion; a foot pedal support bracket attached to the scooter frame, the foot pedal being attached to the foot pedal support bracket and adapted for pivoting on said bracket; a ratchet bar assembly attached to the front pedal portion, the ratchet bar assembly having an elongated ratchet bar extending to and beyond the scooter rear wheel axle gear, the ratchet bar pivoting with respect to the front pedal portion, the ratchet bar moving rearward when the rear pedal portion is pressed toward the scooter frame, the ratchet bar moving forward when the front pedal portion is pressed toward the scooter frame, the ratchet bar further having a plurality of teeth; and a ratchet guard to maintain alignment and engagement of the ratchet bar to the rear wheel axle gear, the ratchet guard being conformed to continuously bias the ratchet bar against the rear wheel axle gear, the ratchet bar teeth engaging the rear wheel axle gear teeth and turning the rear wheel axle gear as the ratchet bar moves forward, the rear wheel axle gear having spring pawls engaging the rear wheel hub.

In another embodiment, the rear wheel axle gear teeth are directionally biased such that the ratchet bar teeth engage the rear wheel axle gear teeth once when the ratchet bar starts moving forward.

In another embodiment, the front and rear pedal portions join to form an obtuse angle.

In another embodiment, the front pedal portion is longer than the rear pedal portion.

In another embodiment, the ratchet guard further comprises an angular top plate to maintain a constant proximity to the rear wheel axle gear during the pivoting motion of the ratchet bar.

In another embodiment, the ratchet bar has a smooth portion, preferably one third of the length of the ratchet bar, the smooth portion being biased against the rear wheel axle gear by the ratchet guard when the rear pedal portion is against the scooter frame, and the ratchet bar teeth begin engagement with the rear wheel axle gear teeth during forward movement as the front pedal portion is pressed toward the scooter frame.

In another embodiment, the foot pedal support bracket further comprises a shaft and the foot pedal further comprises a shaft bracket for receiving the axle such that the foot pedal pivots about the foot pedal support bracket axle.

In another embodiment, the ratchet bar assembly further comprises a ratchet bar bracket extending upwardly from the front pedal portion, the ratchet bar being pivotally attached to the ratchet bar bracket.

In another embodiment, the foot pedal support bracket is attached to the scooter frame by fasteners.

There is also provided, an improved scooter of the type having a frame upon which the rider places at least one foot, a steering assembly having a front wheel, and a rear wheel having an axle attached to the frame, the improvement comprising: a free wheeling rear wheel axle gear attached for forward rotation with the rear wheel hub, the rear wheel hub having bearings and means for engagement with spring pawls, the rear wheel axle gear having teeth; a foot pedal having a front pedal portion and a rear pedal portion; a foot pedal support bracket attached to the scooter frame, the foot pedal being attached to the foot pedal support bracket and adapted for pivoting on said bracket; a ratchet bar assembly attached to the front pedal portion, the ratchet bar assembly having an elongated ratchet bar extending to and beyond the scooter rear wheel axle gear, the ratchet bar pivoting with respect to the front pedal portion, the ratchet bar moving rearward when the rear pedal portion is pressed toward the scooter frame, the ratchet bar moving forward when the front pedal portion is pressed toward the scooter frame, the ratchet bar further having a plurality of teeth; a ratchet guard having an angular top plate, the ratchet guard being attached to the rear wheel axle so as to bias the ratchet bar against the rear wheel axle gear, the ratchet bar teeth engaging the rear wheel axle gear teeth and turning the rear wheel axle gear as the ratchet bar moves forward, the forward motion of the rear wheel axle gear engaging spring pawls in turn engaging the rear wheel hub.

In another embodiment, the rear wheel axle gear teeth are directionally biased such that the ratchet bar teeth engage the rear wheel axle gear teeth only when the ratchet bar is moving forward.

In another embodiment, the front and rear pedal portions join to form an obtuse angle.

In another embodiment, the front pedal portion is longer than the rear pedal portion.

In another embodiment, the ratchet guard further comprises an angular top plate to correspond with the pivoting motion of the ratchet bar while maintaining the proximity of the ratchet bar to the rear wheel axle gear.

In another embodiment, the ratchet bar has a smooth portion, the smooth portion being biased against the rear wheel axle gear by the ratchet guard when the rear pedal portion is against the scooter frame, and the ratchet bar teeth begin engagement with the rear wheel axle gear teeth during forward movement as the front pedal portion is pressed toward the scooter frame.

In another embodiment, the foot pedal support bracket further comprises a shaft and the foot pedal further comprises a shaft bracket for receiving the axle such that the foot pedal pivots about the foot pedal support bracket axle.

In another embodiment, the ratchet bar assembly further comprises a ratchet bar bracket extending upwardly from the front pedal portion, the ratchet bar being pivotally attached to the ratchet bar bracket.

In another embodiment, the foot pedal support bracket is attached to the scooter frame by fasteners.

Also provided is a scooter propulsion system for a scooter of the type having a frame upon which the rider places at least one foot, a steering assembly having a front wheel, and a rear wheel having an axle attached to the frame, the system comprising: a foot pedal having a front portion and a rear portion, the pedal being movable between a first to a second position; means for moving an elongated ratchet bar in a forward and rearward direction in response to movement of the foot pedal from the first position to the second position, and from the second position to the first position, respectively; and means for rotating the scooter rear wheel axle gear in response to forward movement of the ratchet bar.

Also provided is an improved scooter of the type having a frame upon which the rider places at least one foot, a steering assembly having a front wheel, and a rear wheel having an axle attached to the frame, the improvement comprising: a foot pedal having a front portion and a rear portion, the pedal being movable between a first to a second position; means for moving an elongated ratchet bar in a forward and rearward direction in response to movement of the foot pedal from the first position to the second position, and from the second position to the first position, respectively; and means for rotating the scooter rear wheel axle in response to forward movement of the ratchet bar.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the figures illustrate the Scooter Propulsion System of the present invention. With regard to the reference numerals used, the following numbering is used throughout the various drawing figures.

20 Scooter Propulsion System of the present invention
21 rider
22 rider's front foot
23 rider's rear foot
24 scooter terrain 25 scooter steering mechanism
26 scooter front wheel
27 scooter frame
28 scooter rear wheel
29 scooter rear wheel axle
30 scooter rear wheel hub
31 hub bearings
40 foot pedal
42 front pedal portion
44 rear pedal portion
46 foot pedal support bracket
48 foot pedal support bracket shaft
50 foot pedal shaft bracket
51 bolt-nut combination
52 ratchet bar
54 ratchet bar first end
56 ratchet bar second end
58 ratchet bar bracket
60 ratchet bar bracket first side
62 front pedal portion slot
64 ratchet bar bracket bolt
66 ratchet bar bracket second side
68 ratchet bar bracket pin
70 ratchet bar teeth
72 rear wheel axle gear teeth
74 rear wheel axle gear
75 spring pawl
76 ratchet bar smooth side
77 spring
78 ratchet guard
80 ratchet guard first side
81 ratchet guard second side
82 ratchet guard angular top side

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1-12 illustrate the Scooter Propulsion System, and its individual features, the Scooter Propulsion System indicated generally by the numeral 20.

The system 20 is used by the rider 21 who has carefully positioned his or her front foot 22 and rear foot 23 on the system 20 while riding on typical scooter terrain 24. The system 20 is retrofitted to a typical scooter having a steering member 25, a front wheel 26, a generally flat frame 27, and a rear wheel 28 on an axle 29 attached to the frame 27.

Figure 1:
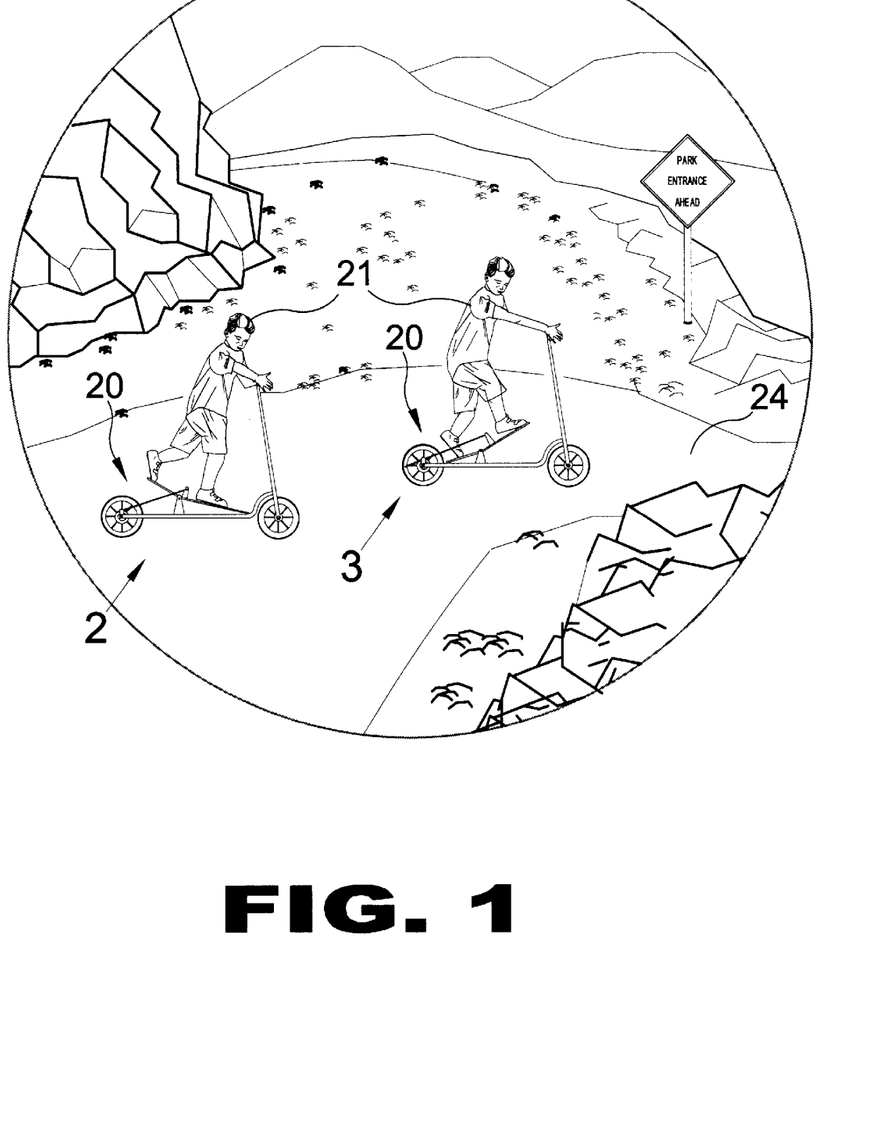
FIG. 1 is a perspective view of the present invention in use. The ratchet propulsion system achieves forward motion by placing both feet on the pedal, one foot behind the other, and shifting the weight of the rider to the rear section of the pedal. The pedal will pivot up and raise the larger front section of the pedal.
Figure 2:
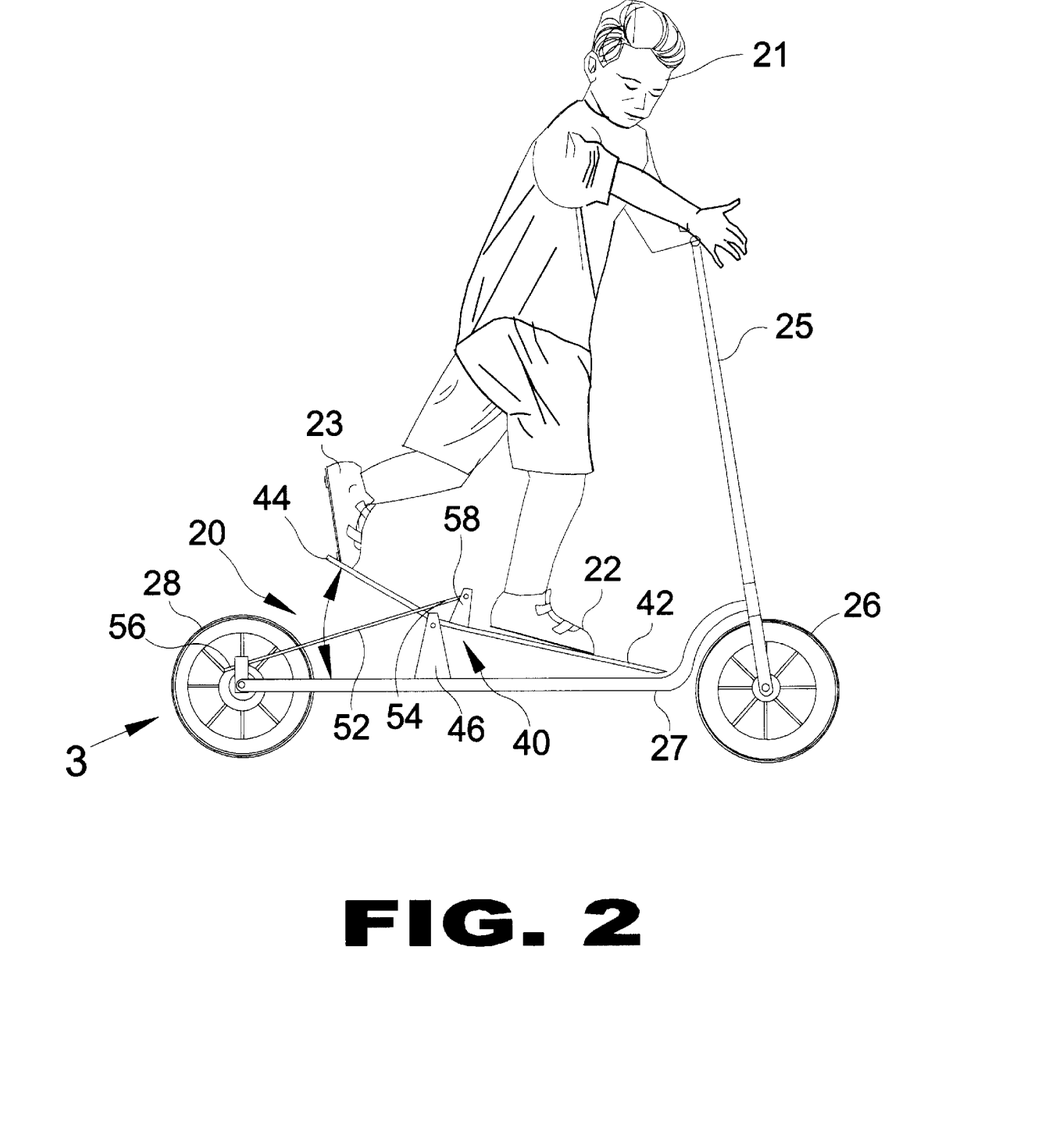
FIG. 2 is a perspective view of the present invention in use. During rearward motion of the ratchet bar it does not affect the rear wheel hub. At this point the rider shifts his or her weight to the front section of the pedal, pushing it downward. This motion pulls the ratchet bar across the rear wheel axle gear, thereby engaging the rear wheel axle gear teeth, thus engaging the spring pawls, rotating the rear wheel and propelling the scooter forward.
Figure 3:
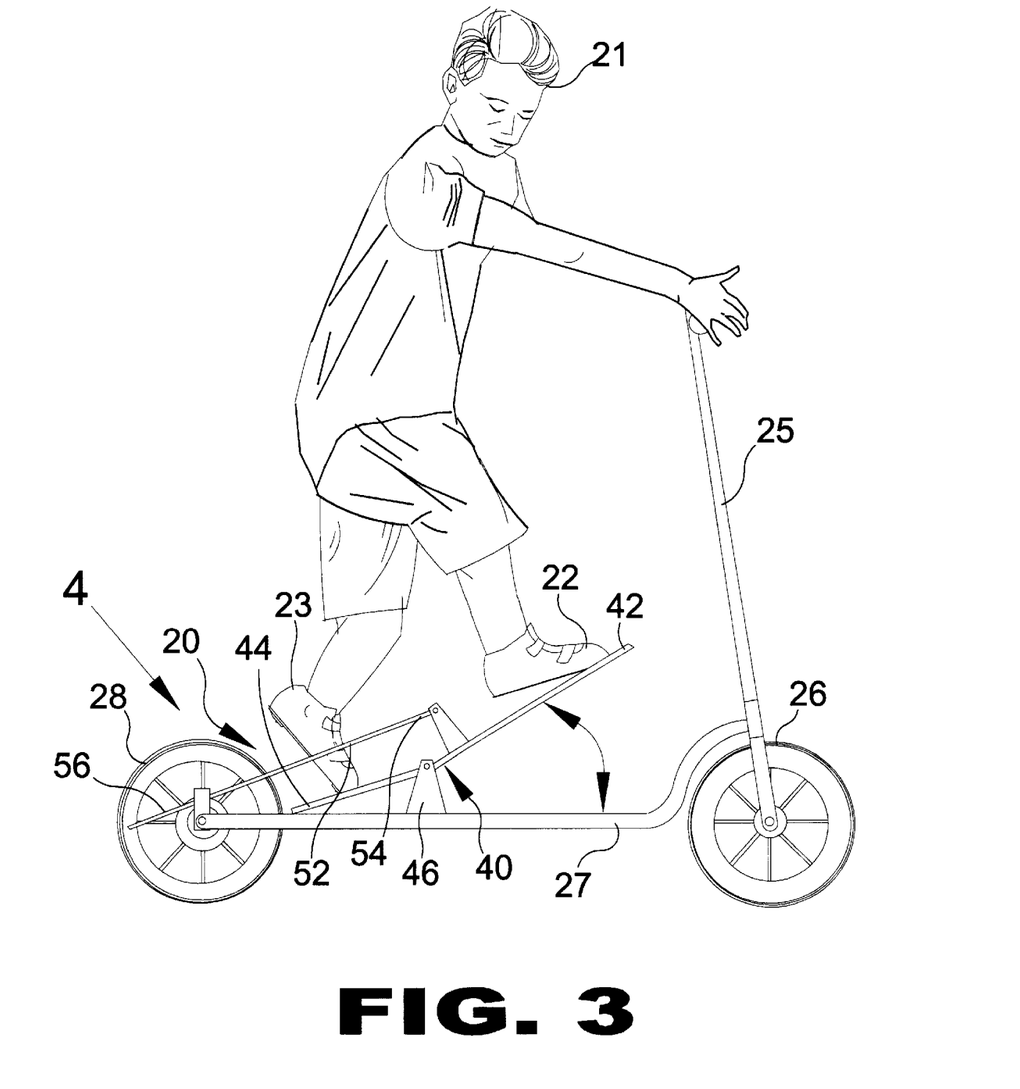
FIG. 3 is a perspective view of the present invention in use with the front of the pedal in the raised position.
Figure 4:
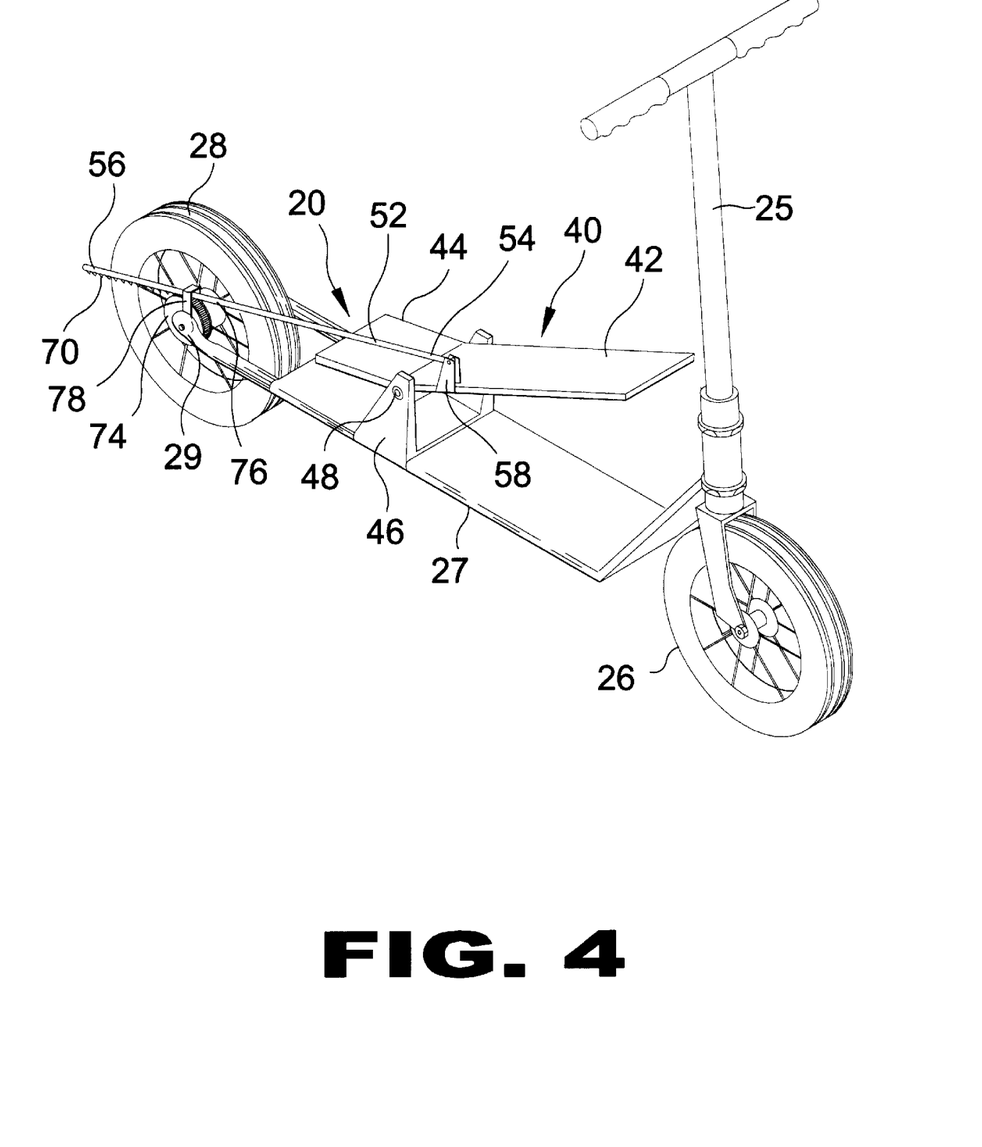
FIG. 4 is a detailed perspective view showing the system of the present invention. The front of the foot pedal is in the raised position and is ready to be pressed to engage the ratchet bar with the rear wheel axle gear.

As shown in FIG. 2 and others, the system 20 includes a foot pedal 40 having a front pedal portion 42 and a rear pedal portion 44, the two portions 42,44 being joined to form an obtuse angle when viewed from the side.

In other embodiments the angle may vary and includes a straight foot pedal as well. In the preferred embodiment the front pedal portion 42 is longer than the rear pedal portion 44, although other embodiments can reverse or equalize this relationship.

Also shown in FIG. 2 is the foot pedal support bracket 46 to which the foot pedal 40 is attached. This attachment is shown in more detail in FIG. 9, wherein the pivoting point is shown to involve a shaft 48 positioned on the foot pedal support bracket 46. The shaft 48 is closely received by a shaft bracket 50 on the foot pedal 40, the foot pedal shaft bracket 50 allowing rotation of the foot pedal 40 about the shaft 48. In the preferred embodiment, the foot pedal shaft bracket 50 is attached to the front pedal portion 42 causing the apex formed by the front and rear pedal portions 42,44 to be positioned slightly behind the shaft 48. In other embodiments the apex can be placed in varying positions in relation to the shaft 48, and the foot pedal support bracket 46 can be of varying heights including heights significantly closer to the foot pedal 40.

Figure 9:
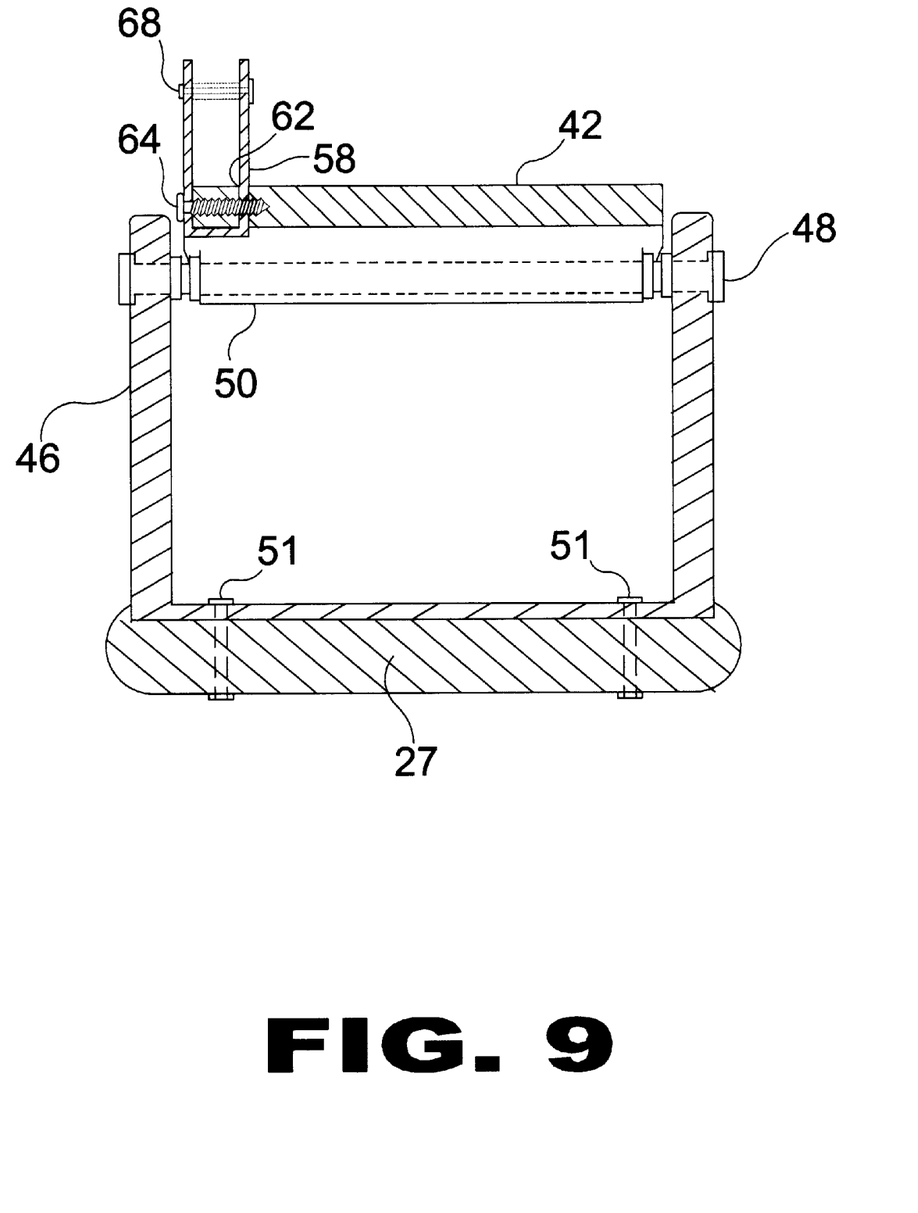
FIG. 9 is a partial front sectional view of the ratchet bar and ratchet bar bracket of the present invention showing the connection of the ratchet bar bracket and the foot pedal support bracket shaft being positioned within the foot pedal shaft bracket, thus enabling the foot pedal to pivot with respect to the scooter frame.
Figure 10:
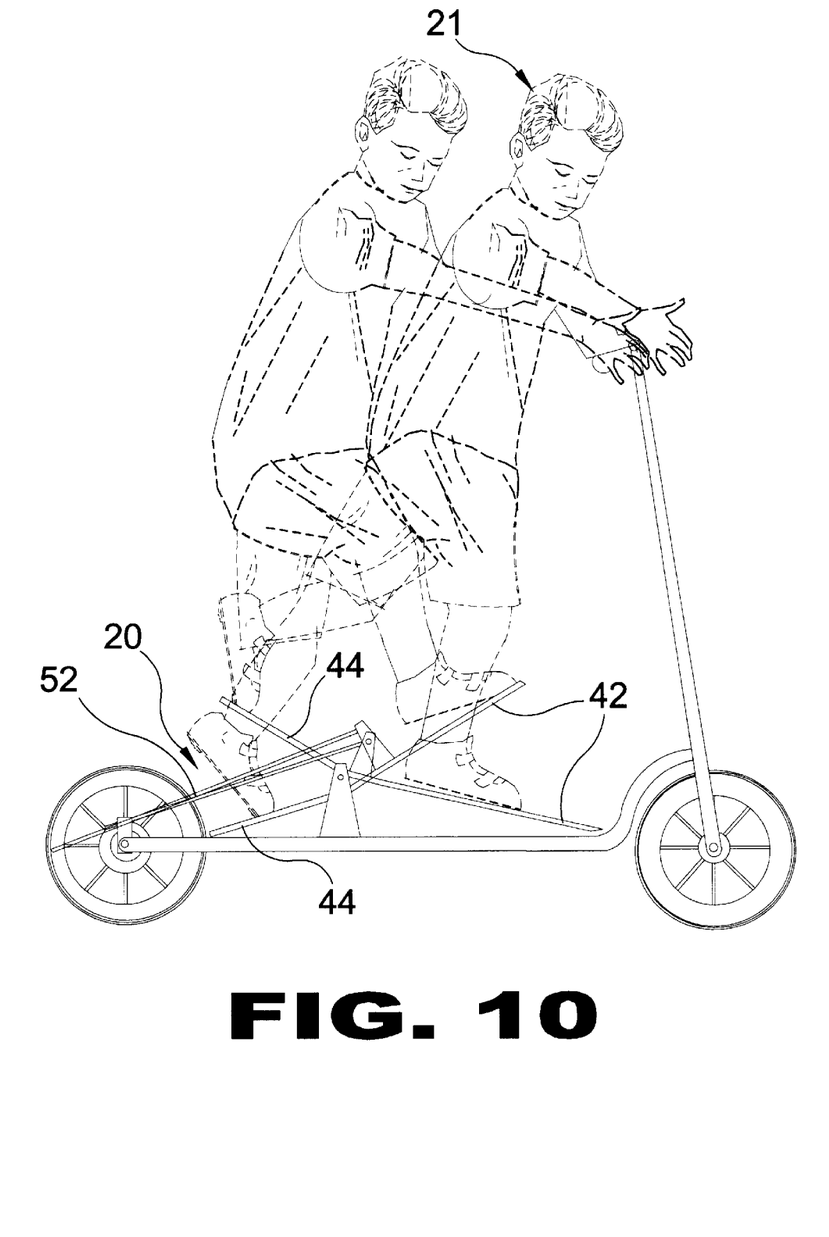
FIG. 10 is a perspective view of the present invention in use. The ratchet propulsion system achieves forward motion by placing both feet on the pedal, one foot behind the other, and shifting the weight of the rider to the rear section of the pedal. The pedal will pivot up and raise the larger front section of the pedal. During rearward motion the ratchet bar is not affecting the rear wheel hub. At this point the rider shifts his or her weight to the front section of the pedal, pushing it downward. As a result of this motion, the ratchet bar moves across and engages the rear wheel axle gear, thus simultaneously engaging the rear axle gear, the spring pawls and rear wheel hub, and propelling the scooter forward.
Figure 11:
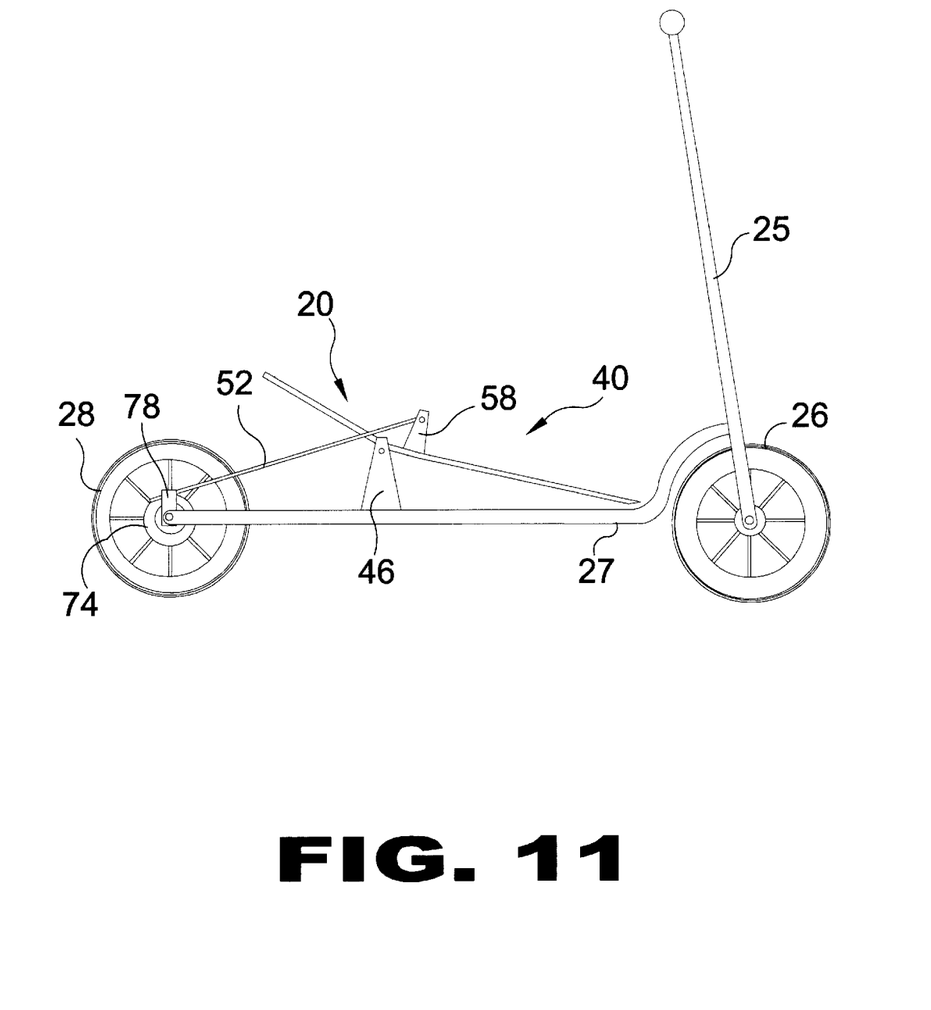
FIG. 11 is a side view of the present invention. The ratchet system of the present invention is shown in the engaged position.
Figure 12:
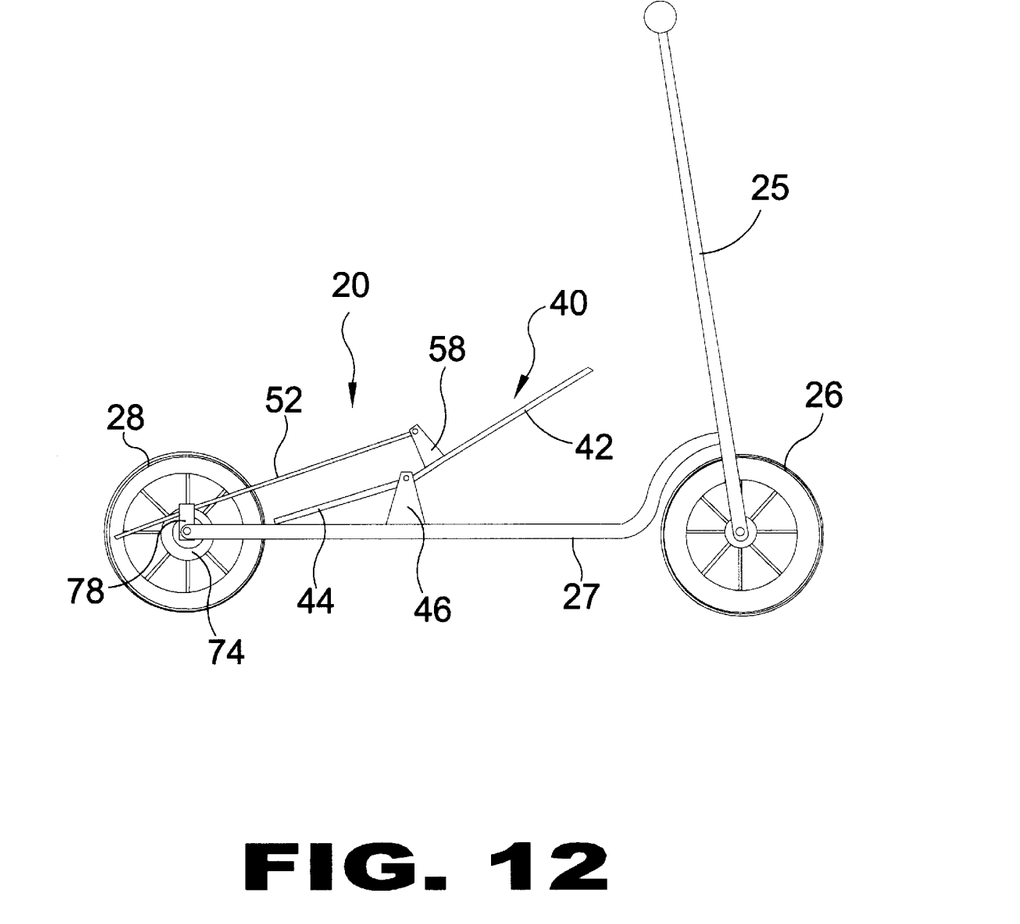
FIG. 12 is a side view of the present invention. The ratchet system of the present invention is shown in the disengaged position.

Furthermore, in the preferred embodiment, the front pedal portion 42 assumes a 15 degree angle at the fulcrum thus allowing greater travel of the front pedal portion 42, while lowering the height needed for the foot pedal support bracket 46.

FIG. 9 illustrates the fasteners, in this case, through bolt and nut combinations 51 that are used to attach the foot pedal support bracket 46 to the scooter frame 27. Other fasteners, including screws, clamps, bands, and the like, are also usable.

Figure 5:
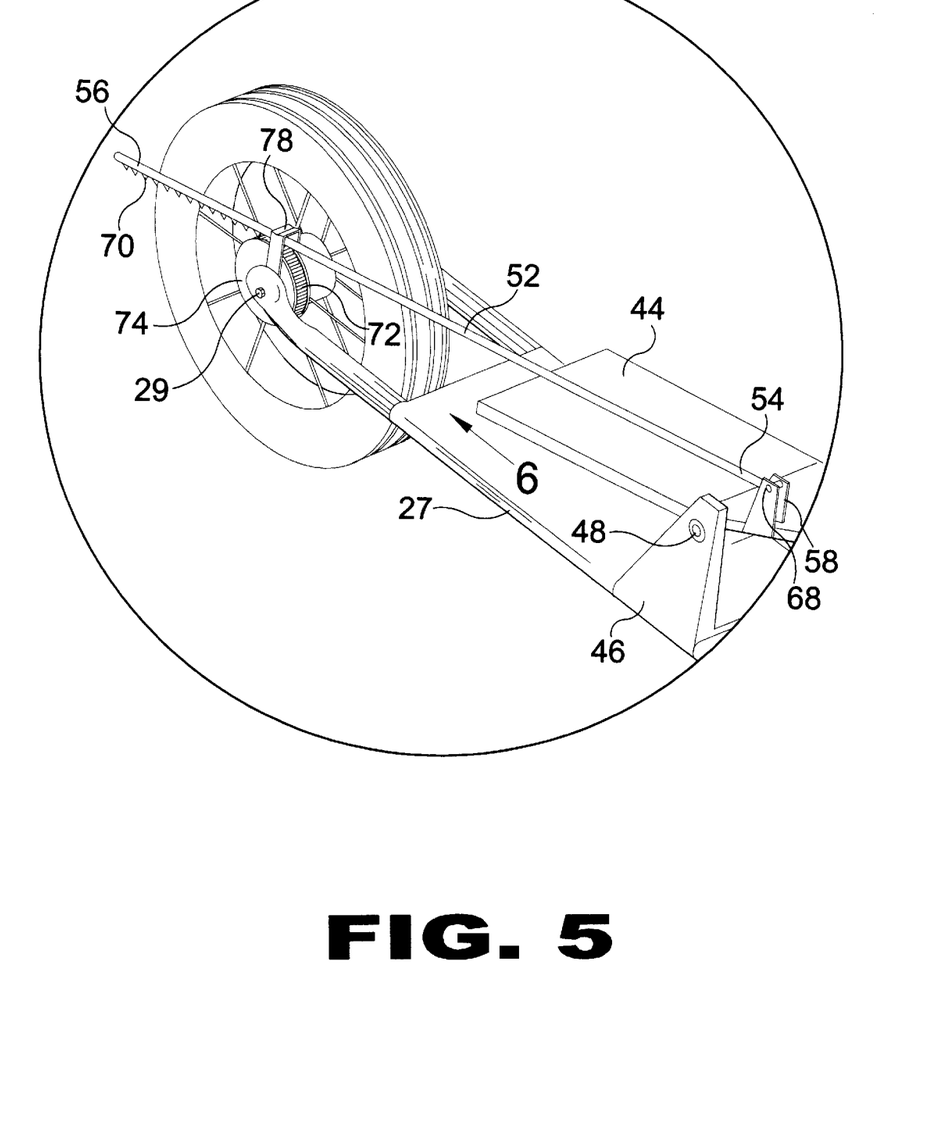
FIG. 5 is a partial perspective view of the rear wheel propulsion mechanism showing the ratchet bar teeth and ratchet bar smooth side.

As shown in FIG. 5, ratchet bar 52 has a first end 54 and a second end 56, the first end 54 being pivotally attached to a foot pedal ratchet bar bracket 58 that is, in turn, attached to the front pedal portion 42. Due to the expected high loads to which the ratchet bar bracket 58 will be subjected, the ratchet bar bracket 58 has a first side 60 that is inserted into a carefully sized slot 62 during installation, as shown in FIG. 9. When the first side 60 is so inserted, a bolt 64 is used to secure the first and second side 60,66 to the front pedal portion 42. The ratchet bar 52 is pivotally attached to the ratchet bar bracket 58 using pin 68, as further shown in FIG. 9.

When so attached, and as shown in FIGS. 2 and 3, and FIGS. 10-12, the ratchet bar 58 is pulled forward when the rider 21 presses down on the front pedal portion 42 with his or her front foot 22. Conversely, when the rider 21 presses down on the rear pedal portion 44 with his or her rear foot 24, the ratchet bar 52 is pushed rearward due to the rearward motion of the ratchet bar bracket 58.

Figure 8:
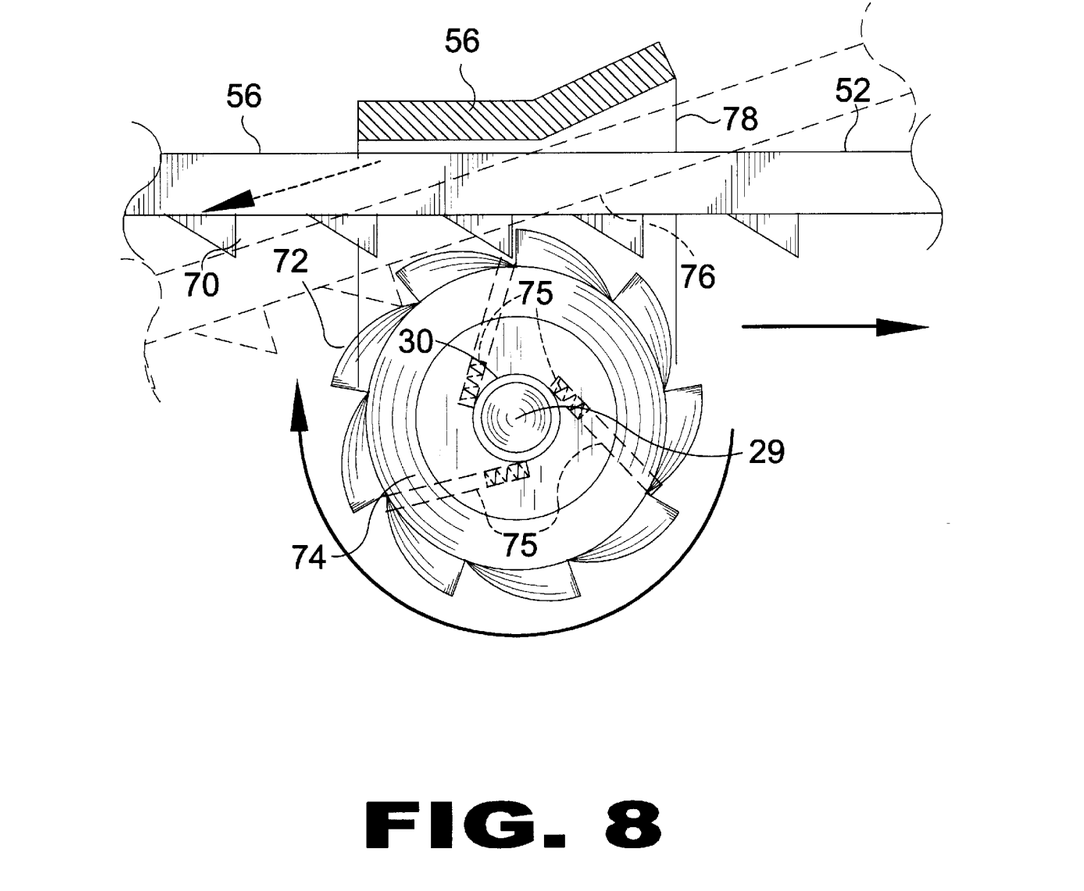
FIG. 8 is a partial sectional side view of the rear wheel axle gear of the present invention. The ratchet bar is fastened to the bracket of the pedal and is driven across the rear wheel axle gear. The ratchet guard will keep the ratchet bar from slipping away from the rear wheel axle gear. Shown in hidden line are the spring pawls and the ratchet bar when the rear pedal portion is pressed down thereby placing the smooth portion of the ratchet bar against the rear wheel axle teeth.

As shown in FIG. 8, the ratchet bar second end 56 has a row of teeth 70 that are shaped to engage the teeth 72 of the rear wheel axle gear 74 on the scooter rear axle 29. In the preferred embodiment, this engagement is limited to the situation where the ratchet bar 52 is moving forward in response to the rider 21 pressing down on the front pedal portion 42. During such movement the teeth 70 begin to encounter and engage the rear wheel axle gear teeth 72. Prior to such movement, and at all times when the rear pedal portion 44 is in the down position, a smooth side 76 of the ratchet bar 52 is positioned against the rear wheel axle gear 74.

Similarly, when the rear pedal portion 44 is being pressed down, the rear wheel axle gear teeth 72 remain engaged with the ratchet bar teeth 70 as the rear wheel axle gear 74 freewheels backwards until rear wheel axle gear teeth 72 disengage as the smooth side 76 is returned to its position against the rear wheel axle gear 74.

Figure 6:
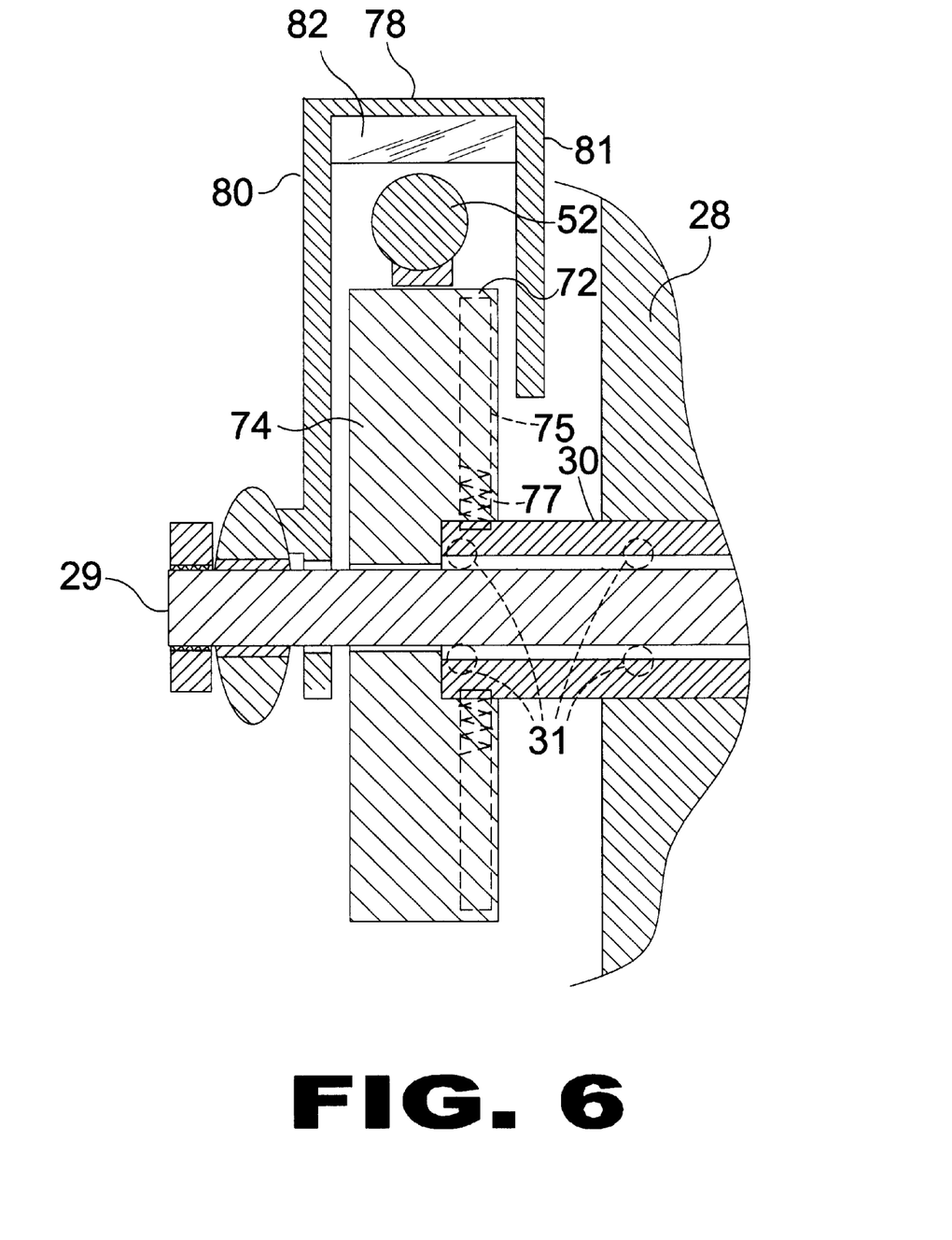
FIG. 6 is a partial perspective view of the propulsion mechanism of the present invention. During the rearward motion of the pedal, the ratchet bar teeth are not engaging the rear wheel axle gear. When the user shifts his or her weight to the front section of the pedal, and pushes it downward, the motion pulls the ratchet bar across the rear wheel axle gear, where the ratchet bar teeth engage the rear wheel axle gear teeth, engaging the spring pawls with the rear wheel hub, thus propelling the scooter forward.
Figure 7:
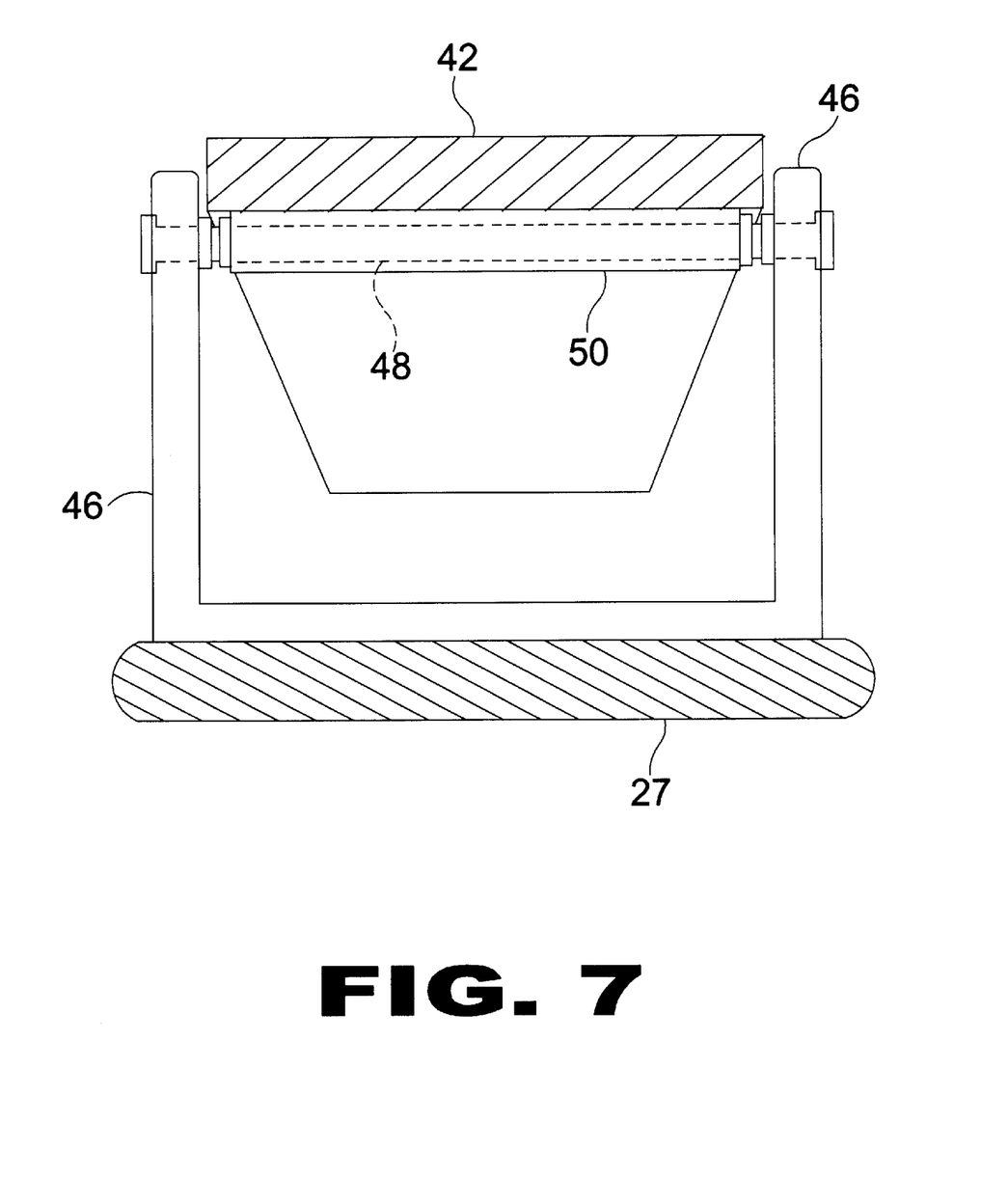
FIG. 7 is a partial front view of the foot pedal support bracket of the present invention. The shaft is shown through the foot pedal support bracket and within the foot pedal shaft bracket as the foot pedal's pivot point.

As shown in FIGS. 6 and 8, a ratchet bar guard 78 is attached to the rear axle 29 and has a first side 80, a second side 81 with a top plate 82. The top plate 82 is conformed at an obtuse angle to maintain a constant engagement of the ratchet bar 52 to the rear wheel axle gear 74 as the ratchet bar 52 pivots during its forward and rearward motion.

When properly installed, the Ratchet Propulsion System 20, allows the rider 21 to initiate the ride by pressing down on the raised front pedal portion 42. This action pulls the ratchet bar 52 such that the ratchet bar teeth 70 are moved into engagement with the rear wheel axle gear teeth 72, thus rotating the rear wheel axle gear 74 and in turn engaging the spring pawls with the rear wheel hub 30 thereby rotating the rear wheel 28. Thus propelled the rider 21 then presses the rear pedal portion 42 such that the ratchet bar 52 is pushed back into its rearmost position, with its unobstructive smooth side 76 against the rear wheel axle gear 74. The repetition of this forward and then rearward manipulation of the foot pedal 40 by shifts in body weight applied through the front and rear feet 22,23, enables incremental increases in speed to suit the desires of the rider 21.

The system 20 components can be constructed from various materials, including various metals, as the preferred materials, although others, such as wood and rigid plastics can also be used.

In another embodiment, the above features are introduced and integrated as improvements to the typical scooter during its original manufacture.

With respect to the above description then, it is to be realized that the optimum material and dimensional relationships for the parts of the system, to include variations in size, materials, shape, and form, will occur to those skilled in the art upon review of the present disclosure, and all equivalent relationships to those illustrated in the drawings and described in the specification are intended to be encompassed by the present invention.

What is claimed as new and desired to be protected by Letters Patent is set forth in the appended claims:

1. A scooter propulsion system for a scooter of the type having a frame upon which the rider places at least one foot, a steering assembly having a front wheel, and a rear wheel having a hub to rotate around an axle attached to the frame, the system comprising:
   a free wheeling rear wheel axle gear having attached spring pawls engageable for forward rotation with the rear wheel hub, the rear wheel axle gear having teeth;
   a foot pedal having a front pedal portion and a rear pedal portion;
   a foot pedal support bracket attached to the scooter frame, the foot pedal being attached to the foot pedal support bracket and adapted for pivoting on said bracket;
   a ratchet bar assembly attached to the front pedal portion, the ratchet bar assembly having an elongated ratchet bar extending to and beyond the scooter rear wheel axle gear, the ratchet bar pivoting with respect to the front pedal portion, the ratchet bar moving rearward when the rear pedal portion is pressed toward the scooter frame, the ratchet bar moving forward when the front pedal portion is pressed toward the scooter frame, the ratchet bar further having a plurality of teeth; and
   a ratchet guard having an angular top plate, the ratchet guard being attached to the rear wheel axle such that the top plate biases the ratchet bar against the rear wheel axle gear, the ratchet bar teeth engaging the rear wheel axle gear teeth and turning the rear wheel axle gear as the ratchet bar moves forward.

2. The system of claim 1, wherein the rear wheel axle gear is free-wheeling and only acts upon the rear wheel hub when pulled forward by the ratchet bar teeth thus engaging the spring pawls with the engagement means of the rear wheel hub.

3. The system of claim 1, wherein the front and rear pedal portions join to form an obtuse angle.

4. The system of claim 1, wherein the front pedal portion is longer than the rear pedal portion.

5. The system of claim 1, wherein the ratchet guard further comprises a first side and a second side, the first side attached to the rear wheel axle and the second side extending down to an area below the top of the rear wheel axle gear yet terminating above the axle.

6. The system of claim 1, wherein the ratchet bar has a smooth portion, the smooth portion being biased against the rear wheel axle gear by the ratchet guard when the rear pedal portion is against the scooter frame, and further wherein the ratchet bar teeth begin engagement with the rear wheel axle gear teeth during forward movement as the front pedal portion is pressed toward the scooter frame.

7. The system of claim 1, wherein the foot pedal support bracket further comprises a shaft and the foot pedal further comprises a shaft bracket for receiving the axle such that the foot pedal pivots about the foot pedal support bracket axle.

8. The system of claim 1, wherein the ratchet bar assembly further comprises a ratchet bar bracket extending upwardly from the front pedal portion, the ratchet bar being pivotally attached to the ratchet bar bracket.

9. The system of claim 1, wherein the foot pedal support bracket is attached to the scooter frame by fasteners.

10. An improved scooter of the type having a frame upon which the rider places at least one foot, a steering assembly having a front wheel, and a rear wheel having an axle attached to the frame, the improvement comprising:
    a freewheeling rear wheel axle gear having spring pawls engageable with the rear wheel hub to provide the axial rotation thereof, the rear wheel axle gear having teeth;
    a foot pedal having a front pedal portion and a rear pedal portion;
    a foot pedal support bracket attached to the scooter frame, the foot pedal being attached to the foot pedal support bracket and adapted for pivoting on said bracket;
    a ratchet bar assembly attached to the front pedal portion, the ratchet bar assembly having an elongated ratchet bar extending to and beyond the scooter rear wheel axle gear, the ratchet bar pivoting with respect to the front pedal portion, the ratchet bar moving rearward when the rear pedal portion is pressed toward the scooter frame, the ratchet bar moving forward when the front pedal portion is pressed toward the scooter frame, the ratchet bar further having a plurality of teeth; and
    a ratchet guard having an angular top plate, the ratchet guard being attached to the rear wheel axle such that the angular top plate biases the ratchet bar against the rear wheel axle gear, the ratchet bar teeth engaging the rear wheel axle gear teeth and turning the rear wheel axle gear as the ratchet bar moves forward thereby engaging the spring pawls with the rear wheel hub resulting in the forward rotation of the attached rear wheel.

11. The scooter of claim 10, wherein the rear wheel axle gear is free-wheeling and only acts upon the rear wheel hub when pulled forward by the ratchet bar teeth thus engaging the spring pawls with the engagement means of the rear wheel hub.

12. The scooter of claim 10, wherein the front and rear pedal portions join to form an obtuse angle.

13. The scooter of claim 10, wherein the front pedal portion is longer than the rear pedal portion.

14. The scooter of claim 10, wherein the ratchet guard further comprises [at least one slot, and the spring assembly further comprises a pin having at least one end positioned within the at least one slot, the pin moving within the at least one slot as the spring is compressed] a first side and a second side, the first side attached to the rear wheel axle and the second side extending down to an area below the top of the rear wheel axle gear yet terminating above the axle.

15. The scooter of claim 10, wherein the ratchet bar has a smooth portion, the smooth portion being biased against the rear wheel axle gear by the ratchet guard when the rear pedal portion is against the scooter frame, and further wherein the ratchet bar teeth begin engagement with the rear wheel axle gear teeth during forward movement as the front pedal portion is pressed toward the scooter frame.

16. The scooter of claim 10, wherein the foot pedal support bracket further comprises a shaft and the foot pedal further comprises a shaft bracket for receiving the axle such that the foot pedal pivots about the foot pedal support bracket axle.

17. The scooter of claim 10, wherein the ratchet bar assembly further comprises a ratchet bar bracket extending upwardly from the front pedal portion, the ratchet bar being pivotally attached to the ratchet bar bracket.

18. The scooter of claim 10, wherein the foot pedal support bracket is attached to the scooter frame by fasteners.

* * * * *